United States Patent [19]

Luong et al.

[11] Patent Number: 4,561,872
[45] Date of Patent: Dec. 31, 1985

[54] METHOD FOR MAKING GLASS OR CERAMIC ARTICLE

[75] Inventors: John C. Luong, Corning; George W. Scherer, Big Flats, both of N.Y.

[73] Assignee: Corning Glass Works, Corning, N.Y.

[21] Appl. No.: 663,161

[22] Filed: Oct. 22, 1984

[51] Int. Cl.$^4$ .............................................. C03B 19/06
[52] U.S. Cl. ........................................ 65/18.1; 65/17; 501/12
[58] Field of Search .......................... 65/17, 134, 18.1; 501/12; 264/56; 106/74

[56] References Cited

U.S. PATENT DOCUMENTS 4,419,115  12/1983  Johnson ............................ 65/18.1 X
4,426,216   1/1984  Satoh .................................. 65/18.1

FOREIGN PATENT DOCUMENTS 84438    7/1983  European Pat. Off. ............. 65/18.1
55-167143  12/1980  Japan .................................. 65/18.1

Primary Examiner—Kenneth M. Schor
Attorney, Agent, or Firm—K. van der Sterre

[57] ABSTRACT

In the process of making a glass or ceramic article by the preparation of a non-aqueous oxide suspension of submicron oxide particles which is thereafter cast into a configuration for the product, gelled, dried, and fired to provide the unitary product, the need to thermally dry and/or protect the oxides from water contamination is avoided by treating the oxide with an alcohol to render it hydrophobic. The desirable gelling and drying characteristics of the suspensions are preserved.

4 Claims, 4 Drawing Figures

METHOD FOR MAKING GLASS OR CERAMIC ARTICLE

BACKGROUND OF THE INVENTION

1. Field of the Invention

The present invention relates to a method for making a glass or ceramic article, and more particularly to a method for making such an article by casting from a gellable suspension of oxide particles.

The concept of preparing ceramic or glass articles from suspensions of oxide particles is used in basic form in the field of slip casting. In that application, slips or slurries of oxide particles, typically greater than one micron in size, are cast, dried and fired to form amorphous glass or crystalline ceramic products. It is difficult, however, to prepare void-free and defect-free products by slip casting due to the relatively large sizes of the oxide particles employed.

Pure oxide particles can be produced by synthetic processes such as the vapor phase oxidation of volatile metallic or metalloid compounds, and articles fabricated from such pure oxides can have unique physical properties. U.S. Pat. No. 2,272,342 to Hyde describes the manufacture of pure fused silica products from $SiCl_4$ by this process, and similar processes are presently used to produce the pure, highly transparent glasses used to fabricate low-loss optical waveguides for telecommunications applications.

Present techniques for shaping products from oxide particles typically involve the direct deposition of the particles from the vapor phase onto a removable substrate, followed by sintering to a unitary mass. This technique limits the configuration of the product, and other means for configuring products from particulate oxides have been sought. However, pure oxide particles produced by vapor phase oxidation are of sub-micron size, typically 0.01–0.5 microns in diameter in unagglomerated form, and are accordingly quite fluffy and difficult to handle.

U.S. Pat. Nos. 4,200,445 and 4,042,361 to Bihuniak et al. illustrate one approach toward solving this problem. In that method, aqueous suspensions of the oxides, termed fumed oxides because of the vapor phase method used for their production, are prepared, cast, dried and sintered to form a densified feed material which can be milled and shaped by slip casting. Glass resulting from this process is typically not of optical quality.

Published European patent application EP No. 0084438 describes an improved shaping method wherein products of arbitrary shape can be produced by the casting of non-aqueous colloidal oxide suspensions. In accordance with that method, submicron-sized oxide particles, e.g. fused silica particles, are first dispersed in a non-aqueous vehicle to form a stable fluid suspension, and the suspension is then formed, as by casting, into a product configuration and caused to gel in that configuration by the addition of a gelling agent. Thereafter, the gelled suspension is dried by removal of the vehicle, and sintered by heating to provide a unitary glass or ceramic product, e.g., of fused silica, having the same configuration (except for drying and sintering shrinkage) as that of the original casting.

It has been customary, in the preparation of suspensions of submicron oxide particles in accordance with the aforementioned process, to subject the particulate oxides to a heat treatment prior to dispersion in the non-aqueous vehicle in order to remove surface hydroxyl groups and adsorbed water commonly present on the surfaces of the particles. Further, the treated oxides are generally stored and dispersed under anhydrous conditions to avoid recontamination with water. These measures are employed because residual hydroxyl groups or water molecules on the particles were found to cause high viscosity and uncontrolled flocculation or gelling of the suspended oxides in the vehicles, particularly when it was desired to prepare suspensions of relatively high solids content.

The need to heat treat the oxides to remove surface hydroxyl groups and water, thereafter to store the oxides in dry form, and to disperse the oxides under anhydrous conditions, is considered disadvantageous because of the added cost of the heat treatment and special storage and handling. Hence a process wherein these steps could be avoided could be of considerable practical benefit.

It is therefore a principal object of the present invention to provide a process for manufacturing glass and ceramic articles from submicron-sized oxide particles which avoids the inconvenience of special handling and the need for a high temperature drying treatment.

Other objects and advantages of the invention will become apparent from the following description.

SUMMARY OF THE INVENTION

The present invention relates to an improvement in the previously described process for making glass or ceramic articles from gellable non-aqueous suspensions of submicron-sized oxide particles. In accordance with that improvement, the oxide particles, which have hydroxyl groups or adsorbed water on their surfaces in commonly available form, are treated with an alcohol prior to dispersion in the non-aqueous vehicle. The alcohol used is of the formula ROH, wherein R is a substituted or unsubstituted aliphatic hydrocarbon group of 3–18 carbon atoms, and the treatment is carried out under conditions appropriate to link the corresponding organic groups (—OR) to the surfaces of the particles. This treatment not only avoids the need to thermally "dry" the oxide particles, but also renders them more readily dispersible in the non-aqueous vehicle, permits the incorporation of increased concentrations of oxides in the vehicle, and yet still produces a suspension which can be gelled in controlled fashion to the extent necessary to form a unitary casting.

The treatment of oxide particles with alcohols, termed "esterification" or "etherification" in the prior art, is thought to involve the replacement of surface hydroxyl groups with surface —OR (e.g. alkoxyl) groups by the following reaction:

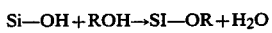

$$Si—OH + ROH \rightarrow SI—OR + H_2O$$

In the present invention, the attached OR groups serve not only to displace OH groups, thereby removing an agent for coagulation from the suspension, but also, with appropriate alcohol selection, can serve the function of a dispersing and stabilizing agent. Treated oxides are typically rendered hydrophobic and lyophilic by the treatment.

In prior art suspensions of "dried" oxide particles, propanol and higher normal alkanols were used as vehicle additives to stabilize the suspensions by steric hinderance. An additional feature of the present invention is that oxides pretreated to provide surface alkoxy groups can in many cases be directly dispersed in simple non-aqueous vehicles without the need for additional dispersants.

The treatment of oxide particles having surface hydroxyl groups to produce surface "derivatized" OR-linked particles involves contacting the particles with a selected alcohol under conditions appropriate for promoting the substitution of the corresponding alkoxy groups for the existing hydroxyl groups. Heating the oxide in the presence of liquid or vaporized alcohol is normally required, as hereinafter more fully described.

Depending upon the degree of esterification of the oxide particles, the resulting suspension may be highly stable against gelation. Thus gelling agents such as the basic amines, which are highly effective to gel non-aqueous suspensions of "dried" oxides, are frequently ineffective to cause gelation in these suspensions of highly esterified particles. However, the use of an acidic additive, alone or in combination with these or other basic gelling agents, can result in satisfactory gelling of even very stable suspensions of the surface-treated oxide particles.

BRIEF DESCRIPTION OF THE DRAWING

The invention may be further understood by reference to the drawing, wherein.

DETAILED DESCRIPTION

Figure 1:
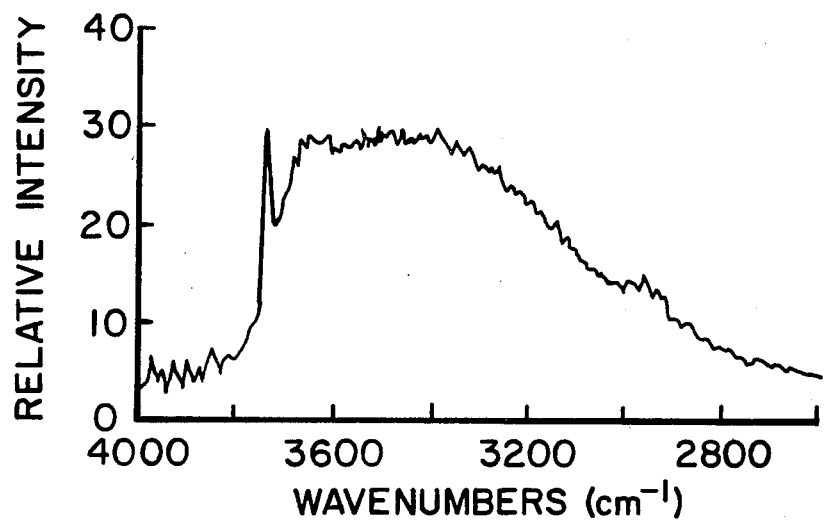
FIG. 1 consists of an infrared absorption spectrum of a sample of commercially available silica.

The kinetics of silica surface esterification by n-butanol have been described by C. C. Ballard et al. in *J. Phys. Chem.* 65, 20-25 (1961). Also, C. J. van Oss et al., in *J. Colloid Interface Sci.* 89 (2), 594 (1982), have reported studies of phase separation in cyclohexane systems containing silica particles covalently coated with stearyl groups by esterification.

The general objective of silica surface esterification has been to render the silica hydrophobic and organophilic. Typical applications for organophilic silica are discussed by Ralph K. Iler in "The Chemistry of Silica," Wiley New York (1979) pages 570–621, and include use as thickeners in organic systems such as greases and paints, and as reinforcing or hardening agents in organic solids such as rubber.

As previously noted, the alcohol used for surface modification according to the present invention can be any one or a combination of alcohols of the general formula R-OH, wherein R is a substituted or unsubstituted aliphatic hydrocarbon group of from 3-18 carbon atoms. Shorter chain alcohols have been used to produce hydrophobic silica particles, but —OR group bonding with volatile alcohols is difficult to carry out at ambient pressures, and the surface-treated oxide products are not as easily dispersed and stabilized in non-aqueous vehicles as are products treated with higher alcohols. Similarly, very large alcohol molecules (e.g. with more than 18 carbon atoms) can be used but are more expensive and difficult to use than alcohols of moderate molecular size.

Substituted alcohols can also be used to provide organophilic oxide particles, with substituents such as halogens, additional hydroxyl groups, and aryl groups not generally being detrimental to the process. However, such substituents generally impart no significant performance advantages to the alcohol and are not preferred.

The preferred class of alcohols for oxide particle surface treatment according to the invention are those wherein R is a saturated aliphatic hydrocarbon group of from 3-10 carbon atoms. Particular examples are n-butanol, n-propanol, n-octanol and n-decanol. These tend to provide the best combination of dispersion properties, convenience of application, and non-interference with known suspension gelling techniques.

Oxides which are considered to be treatable according to the invention to provide suspensions suitable for subsequent forming and gelling include any of the known inorganic metal oxides susceptible to hydration or surface hydroxylation with water. These include, but are not limited to, $SiO_2$, $Al_2O_3$, $TiO_2$, $MgO$, $GeO_2$, $P_2O_5$, $ZrO_2$ and $SnO_2$. The oxides $SiO_2$, $Al_2O_3$ and $TiO_2$ are expected to be particularly important for these casting processes and suitable for treatment.

The treatment used to react the alcohol with the selected particulate oxide to produce surface-derivatized particles depends upon the particular oxide and alcohol selected. The oxide must be contacted with the alcohol at a temperature and for a time sufficient to substitute —OR groups for OH groups on the surfaces of the particles; this can typically be accomplished within hours at temperatures near the boiling points of the common normal alcohols. Thus refluxing a mixture or suspension of the hydrated or hydroxylated oxide in the selected alcohol, with removal of the water by-product (and most of the excess alcohol) by distillation in the course of the treatment, has been successfully used to bond —OR groups such as butoxy groups to the surfaces of silica particles.

Alternative surface treating approaches are also possible. For the higher boiling alcohols, e.g., n-decanol, heating the oxide in contact with the liquid alcohol at temperatures below the boiling point of the alcohol may provide a sufficient degree of esterification. The degree of esterification as defined by Ballard et al., supra, corresponds to the number of alkoxy groups attached to the surfaces of the particulate oxide per square nanometer (nm) of specific surface area. The degree of esterification depends not only on the treatment utilized to react the alcohol with the oxide surface, but also on the condition (e.g., degree of hydroxylation) of the oxide at the time of treatment and the size of the alkoxy groups being bonded. In general, larger alkoxy groups occupy more area on the particle surface than smaller groups, with the result that a greater degree of esterification (though not necessarily better dispersion) is attainable with lower alcohols.

For some alcohols, and depending also on the condition of the oxide surface, it is possible to promote a reaction between surface hydroxyl and ROH molecules in the vapor phase to obtain the desired alkoxy group bonding. Pressurized reaction environments may be useful with vapor phase reactions depending upon the boiling characteristics of the selected alcohol and the reaction temperatures required.

The oxide-alcohol reaction may be carried out without any previous treatment of the oxide, in which case large amounts of adsorbed water and surface hydroxyl groups are typically present on the oxide material as it is subjected to the alcohol treatment. Alternatively, the oxide may be pretreated to remove some of the water and surface hydroxyl groups prior to treatment. Such pretreatments may include heating at temperatures sufficiently high (e.g., 1000° C. in the case of $SiO_2$) to remove all but isolated surface hydroxyl groups from the oxides; however, the residual isolated hydroxy groups may still be replaced by alkoxy groups during esterification to provide a dispersible oxide with good stability in suspension.

The non-aqueous vehicle used for dispersing the alcohol-treated oxides to provide a stable, gellable suspension can be any one of the vehicles utilized in the prior art for the purpose. However, the preferred vehicles are non-polar, substituted or unsubstituted hydrocarbon liquids which provide good wetting of the treated oxide and a suspension which is stable against gelation in the absence of an appropriate gelling agent. Particularly preferred vehicles are chloroform, hexane, toluene, and methylene chloride.

As previously noted, oxides treated with alcohols in accordance with the foregoing description are generally hydrophobic and organophilic, so that they are all much more easily wetted by the non-polar vehicle than are untreated oxides. Nevertheless the ease with which any particular oxide can be fully dispersed, the viscosity of the resulting suspension, and the stability of the suspension against gelation all depend to some degree upon the degree of surface esterification and, most importantly, upon the corresponding number of residual hydroxyl groups, if any, coexisting with surface alkoxy groups on the surfaces of the particles.

In the case of oxides treated to obtain the highest possible degree of esterification, as by prolonged contact at boiling temperature with liquid alcohols, dispersion is particularly easy, the viscosity of the resulting suspension is relatively low, and the suspensions are very stable against gelation. In the case of highly esterfied silica particles, low viscosity suspensions at solids contents in excess of 20 volume percent can be prepared which resist gelation even in the presence of basic gelling agents such as ammonia and highly basic amines.

On the other hand, oxides such as silica, if treated mildly with alcohol in the vapor phase without prior drying, can be handled under ambient conditions and exhibit improved wettability by non-aqueous vehicles, but do not disperse easily unless additional dispersants are added to the vehicle to aid dispersion and help to stabilize the suspension.

Suspensions of treated oxides as above described can be caused to gel, after forming into the desired product configuration, by the addition of acidic or basic gelling agents to the suspensions before, during or after forming. The ease of gelling, however, depends strongly on the particular oxide surface treatment employed. This behavior is attributed to differences in the degree of esterification and residual hydroxylation of the esterified particles. Thus in some cases a combination of acidic and basic gelling agents provide more efficient gelling than do the basic gelling agents preferred in the prior art.

In general, in suspensions wherein a relatively high concentration of residual hydroxyl groups is present on the dispersed oxide, gelling is easily accomplished with basic gelling agents such as ammonia and low-molecular weight primary, secondary and tertiary amine gelling agents. This is true notwithstanding the presence of significant concentrations of alkoxy groups on the surfaces of the oxide particles.

Where instead virtually all surface hydroxyl groups have been removed from the particle surfaces, as by a prolonged esterification treatment or a combination of thermal drying and surface esterification, basic gelling agents alone are relatively inefficient. In these cases acidic gelling agents in combination with basic gelling agents are used. It is presently believed that gelation in these cases involves an initial hydrolytic removal of surface alkoxy groups which could occur as follows:

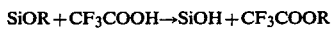

$$SiOR + CF_3COOH \rightarrow SiOH + CF_3COOR$$

Gelation of the resulting de-esterified species may then occur spontaneously or may be promoted by the addition of a basic gelling agent.

The properties of gelled suspensions produced using treated oxides are very similar to those of untreated oxides, except that in some cases gels of higher solids content can be prepared and the suspensions are more stable against the effects of ambient moisture. In addition, the use of treated oxides can permit the formulation of suspensions not easily stabilized with untreated oxides. Hence, non-aqueous alumina suspensions tend to be alkaline in nature, and this alkalinity can result in undesirable coagulation when alumina suspensions are mixed with non-aqueous silica suspensions susceptible to gelation in the presence of bases. This coagulation tendency can be avoided by using esterfied silicas in the preparation of mixed suspensions.

The invention may be further understood by reference to the following examples illustrating the production of glass products in accordance therewith.

EXAMPLE 1

A 20 gram sample of commercially available particulate silica, Aerosil OX-50 silica from Degussa, Inc. of Teterboro, N.J., having a surface area of about 50 $m^2$/gram and an average particle diameter of approximately 0.45 microns, is provided. As received from the supplier, this material has an infrared spectrum, as determined by photoacoustic Fourier Transform (FT) infrared (IR) analysis, substantially as shown in FIG. 1 of the drawing. The narrow peak at about 3750 $cm^{-1}$ and the broad peak at 3700–3200 $cm^{-1}$ in FIG. 1 indicate, respectively, the presence of isolated silanol groups and vicinal (proximately located) silanol groups with adsorbed water on the surfaces of the particles.

The oxide sample is treated with n-butanol (b.p=117.5° C.) by adding to 200 ml of the alcohol and heating the mixture at reflux for about 15 hours. During this reflux procedure approximately 100 ml of the liquid phase is permitted to distill off, resulting in the removal of most of the adsorbed and by-product water as a water-butanol azeotrope.

Figure 2:
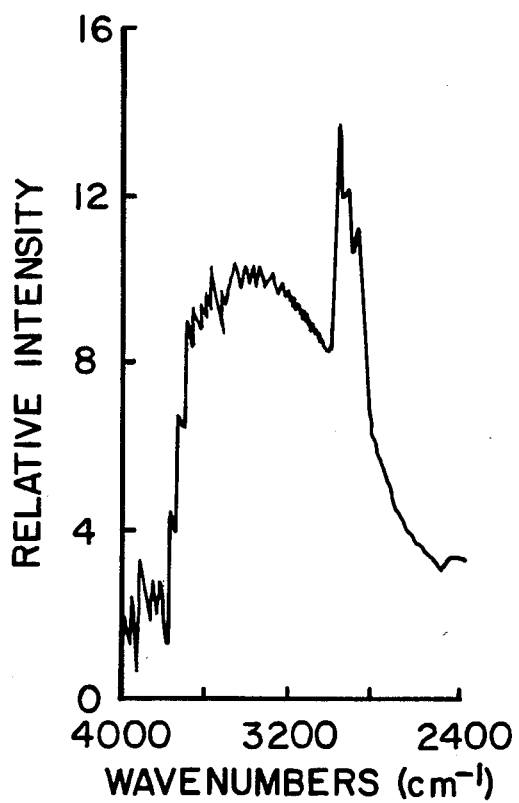
FIG. 2 consists of an infrared absorption spectrum of the silica material of FIG. 1 after treatment with an alcohol reactant.

Excess alcohol is then removed from the silica sample by vacuum distillation at about 100° C. The product, referred to as butoxylated silica powder, is examined by photoacoustic FT-IR analysis, with typical results being as shown in FIG. 2 of the drawing. In comparison with FIG. 1, the isolated silanol peak at 3750 $cm^{-1}$ has disappeared and the samples typically exhibit a peak at 3000–2800 $cm^{-1}$, which is attributed to C-H bond stretching on the butoxy groups bonded to the surfaces of the silica particles. The degree of esterification (as defined by Ballard et al., supra) of this silica is estimated to be approximately 2, based on chemical analysis.

A 6-gram sample of the butoxylated silica thus produced is then added to 15 ml. of a chloroform vehicle, and dispersed by shaking. No added dispersant is needed; the resulting silica suspension is fluid and stable. It does not gel upon the addition of strongly basic gelling agent such as 1,3 diaminopropane. This is in direct contrast to a chloroform suspension of thermally dried silica, dispersed with e.g., n-butanol, which can be rapidly gelled by this base.

A fused silica glass product can be made from a chloroform suspension made according to this Example as follows. To 50 ml of a $SiO_2$-chloroform suspension prepared as described above are added a few drops of trifluoroacetic acid, with stirring to obtain complete mixing. Thereafter, a small amount of a 1,3-diamino propane gelling agent is added, the mixture is shaken, and then cast into a mold cavity 5 cm × 5 cm in size to a depth of about 1 cm, the mold cavity being loosely lined with a flexible polyethylene film. Gelation occurs within a few minutes, and the resulting gel is permitted to dry slowly under a vented cover over an interval of 72 hours.

The dried casting is next heated to 800° C. to remove residual organics and then sintered to a clear glass article at 1400° C. within about 30 minutes. The quality of a glass article produced by this procedure would be equivalent to that produced using thermally treated $SiO_2$.

As previously noted, the stability of the suspension and the ease with which it can be gelled depend somewhat on the degree of esterfication of the oxide. This effect is shown by the following Example.

EXAMPLE II

A sample of Aerosil OX-50 is refluxed in n-butanol utilizing the procedure of Example I, except that refluxing is continued for only two hours instead of 15 hours. The butoxylated silica product has a lower degree of esterification, estimated at about 0.4.

A chloroform suspension of this treated silica, which is stable and fluid at a solids content of about 15 vol. percent, is readily gelled by the addition of a 1,3 diaminopropane gelling agent or by exposure to a gellant of $NH_3$ gas. The resulting gel can be dried and sintered to clear fused silica as described in Example I.

The preparation and use of an alkoxylated silica treated with a higher-boiling alcohol is described in the following example.

EXAMPLE III

A 50-gram sample of Aerosil OX-50 silica is mixed with 200 ml. of n-octanol (b.p.=194° C.) to form a slurry and the slurry is poured into a glass tube fitted with a porous fritted glass plug closure at one end. This tube is part of a concentric tube assembly which also includes an outer tubular glass envelope, encasing the inner closed tube. The outer tube includes opposing end ports for the passage of a controlled atmosphere over the closed inner tube.

As nitrogen gas is piped through the outer envelope and around the inner tube, the entire glass assembly and contents are heated to approximately 180° C. in a tube furnace, and are maintained at that temperature for about 15 hours. Alcohol vapors escaping from the inner tube through the porous plug are condensed from the nitrogen stream in a bubbler maintained at room temperature.

At the end of this heating interval, the alcohol-treated silica is removed from the apparatus and examined by photoacoustic FT-IR analysis. The spectrum observed is very similar to that shown in FIG. 4, but with a somewhat larger C-H stretching frequency peak at 3000–2800 $cm^{-1}$.

The octanol-treated silica produced as described can be dispersed directly in hexane to produce a very fluid suspension, or it can be dispersed in chloroform, in both cases without the aid of an added dispersant. The octanol suspension is sufficiently stable against gelation in the presence of a base that it can be mixed with an equal volume of a non-aqueous alumina suspension (8 vol. percent $Al_2O_3$ in a methanol-chloroform vehicle) without coagulation upon mixing. Gelation of the mixture can then be induced by the addition of trifluorocetic acid to produce a gelled $Al_2O_3$—$SiO_2$ body of any selected composition, which can be sintered to a non-porous ceramic body if desired.

As previously noted, it is possible to carry out the esterification procedure on oxides which have been thermally treated for partial removal of surface hydroxyl groups, with the resulting treated oxide still exhibiting useful dispersion and gelling characteristics. This procedure is shown by the following example.

EXAMPLE IV

Figures 3, 4:
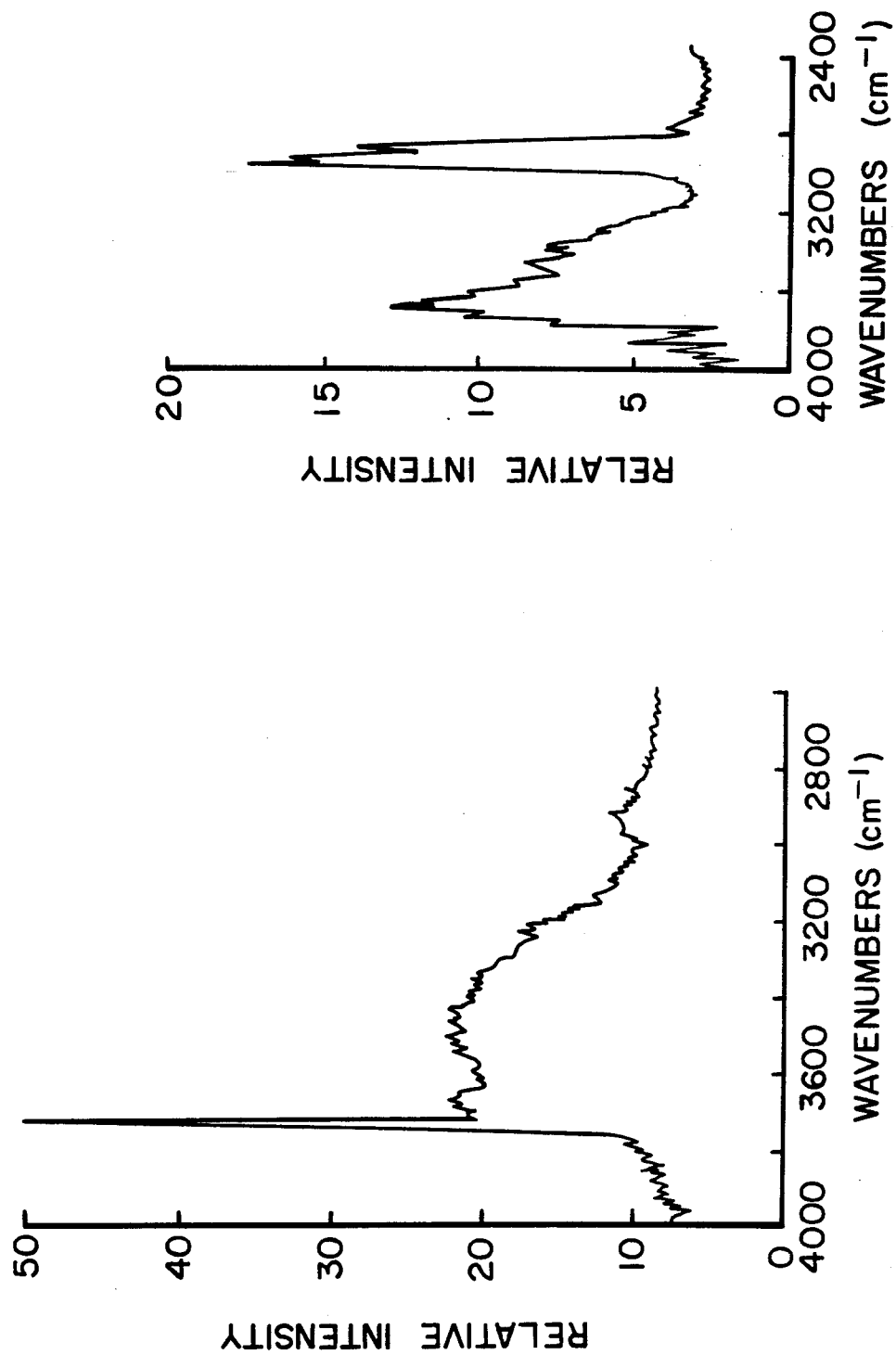
FIG. 3 consists of an infrared absorption spectrum of a silica material similar to that of FIG. 1 after a heat treatment at 800° C., and FIG. 4 consists of an infrared absorption spectrum of a heat-treated silica material after further treatment with an alcohol reactant.

A 25-gram sample of colloidal silica material equivalent to that of the OX-50 silica described in Example I is heated to 800° C. for 30 minutes to remove surface hydroxl groups from the oxide. Photoacoustic FT-IR analysis of the thermally treated oxide yields a spectrum such as shown in FIG. 3 of the drawing. The peak at 3750 $cm^{-1}$ in FIG. 3 indicates the presence of residual silanol groups, while the substantial reduction of the broad peak at 3700–3200 $cm^{-1}$ (as seen in FIG. 1) suggests significant removal of vicinal silanol groups and adsorbed water.

The thermally treated oxide produced as described is subjected to an alcohol treatment in n-butanol substantially as described in Example 1. The product, with surface butoxy groups substituted for the isolated silanol groups, exhibits an FT-IR spectrum substantially as shown in FIG. 4 of the drawing.

The butoxylated oxide produced as described exhibits dispersion and gelling characteristcs similar to those of the surface treated oxide of Example I, i.e., it is readily dispersible in non-aqueous vehicles without the need for added dispersants, and its suspensions resist gellation by basic amines except in the presence of acids.

Oxides prepared in accordance with the procedure of this Example IV are expected to offer the advantage of longer shelf life in an ambient environment, when compared with the oxide produced in Example I, a behavior attributed to the absence of vicinal silanol groups on the surface-treated material of Example IV. These groups are believed to provide sites for water adsorption, with adsorbed water leading gradually to loss of hydrophobic behavior in the oxide through hydrolytic removal of surface alkoxy groups from treated oxide surfaces.

As previously noted, it is also possible to obtain a useful degree of surface esterification in a vapor phase alcohol treatment process. This procedure is illustrated by the following example.

EXAMPLE V

A 20 gram sample of Aerosil OX-50 silica is poured into a reaction tube provided with opposing end ports for the channeling of vapors through the tube. The tube is positioned in a tube furnace operating at a temperature of 250° C., and a stream of argon at a slow flow rate is passed through the tube. After the tube has been swept with nitrogen, vapors of n-decanol are introduced into the argon stream at a rate of about 120 grams/minute, by diverting the argon through a bubbler containing n-decanol and heated to about 200° C., and the resulting decanol/argon vapor mixture is passed over the silica for a period of about 3 hours.

At the conclusion of this treatment, the treated silica is cooled and removed from the tube and examined. It is found to exhibit hydrophobic behavior, attributable to the presence of surface alkoxy groups, and to be wettable with organic vehicles such as hexane and chloroform, although it is not easily dispersed in these vehicles simply by shaking.

To form a stable dispersion of this treated oxide in a chloroform vehicle, a 6 gram sample of the treated oxide is added to a mixture consisting of 15 ml. of chloroform and 2 ml. of propanol as an added dispersant. Dispersion of the treated oxide in the vehicle is accomplished by shaking. The suspension exhibits good stability, although it is not as fluid or high in solids content as suspensions produced with more highly esterified oxides.

Gelling of this suspension is accomplished by flowing ammonia gas over the surface of the sample, with gelling of the suspension occurring within about 7 minutes. The gelled suspension can be dried and sintered to provide an optically clear, crack-free fused silica article having the configuration of the gelled suspension.

EXAMPLE VI

Esterification treatments such as above described are also useful to prepare gellable colloidal suspensions of other oxides. To prepare an $Al_2O_3$ suspension, 50 grams of $Al_2O_3$, commercially available from Degussa, Inc. as Alumina C, is combined with n-butanol to produce a flowable suspension, and the suspension is refluxed for 16 hours to esterify the $Al_2O_3$. Excess n-butanol and water are then driven off by distillation, and 30 grams of the moist butoxylated alumina product is mixed with 50 ml of chloroform to produce a fluid colloidal $Al_2O_3$ suspension containing about 15 vol. % $Al_2O_3$.

The $Al_2O_3$ suspension thus provided can be gelled by first adding a few drops of trifluoroacetic acid, with mixing to obtain good dispersion, and thereafter adding a small quantity of a 1,3-diamino propane gelling agent. The resulting colloid can be cast and will set in a few minutes to a firm gel which can be dried and sintered to an alumina ceramic body.

Colloidal $TiO_2$ suspensions can be prepared in the manner described above for $Al_2O_3$ suspensions, and can be gelled using the same procedures to provide castings which can be dried and sintered to high quality $TiO_2$ ceramics.

As is evident from the foregoing description, the present invention is useful not only for the preparation of suspensions of single oxides, but also for the preparation and stabilization of mixed oxide suspensions. For this reason it has particular application for the production of glass and ceramic products containing a variety of oxide compositions, provided only that the oxides are available in a particulate form which can be suitably suspended in a non-aqueous vehicle and converted to a gel through the use of appropriate gelling agents.

It is not a requirement that all of the hydroxyl groups present on the surfaces of all of the oxides present in a non-aqueous suspension be replaced. Rather partial replacement of surface hydroxyls with surface alkoxy groups, even on only selected oxide constituents, can be beneficial. Such partial replacement can at least render the oxides wettable and directly dispersible with appropriate dispersing agents in a selected vehicle system, thereby avoiding the need for a drying treatment.

We claim:

1. In a method for making a glass or ceramic article which comprises the steps of dispersing submicron-sized oxide particles in a non-aqueous vehicle to form a fluid suspension, forming the suspension into a configuration for a preform for the article and causing it to gel in that configuration, drying the gelled preform, and sintering the gelled preform to produce a unitary glass or ceramic article, the improvement wherein:

prior to dispersion of said oxide particles in the non-aqueous vehicle, the oxide particles are treated with an alcohol to render them hydrophobic, wherein the treatment of the oxide particles comprises contacting the oxide particles with an alcohol at a temperature sufficient to react the alcohol with hydroxl groups present on the surfaces of the particles, the alcohol being of the formula ROH wherein R is a substituted or unsubstituted hydrocarbon group of from 3–18 carbon atoms and the reaction resulting in the substitution of —OR groups for hydroxyl groups on the surfaces of the particles.

2. A method in accordance with claim 1 wherein the alcohol is an unsubstituted aliphatic alcohol containing 3–10 carbon atoms.

3. A method in accordance with claim 2 wherein, for the treatment with alcohol, the oxide particles are contacted with alcohol in liquid phase.

4. A method in accordance with claim 2 wherein, for the treatment with alcohol, the oxide particles are contacted with vapors of alcohol.

* * * * *